United States Patent [19]

Pfanhouser et al.

[11] Patent Number: 4,851,914
[45] Date of Patent: Jul. 25, 1989

[54] HIGH-SPEED FULL FRAME IMAGING CCD CAMERA

[75] Inventors: Wilhelm Pfanhouser, Santa Clara; Joseph H. Owren, Sunnyvale, both of Calif.

[73] Assignee: Marco Scientific, Sunnyvale, Calif.

[21] Appl. No.: 82,018

[22] Filed: Aug. 5, 1987

[51] Int. Cl.$^4$ .............................................. H04N 5/335
[52] U.S. Cl. ........................ 358/213.19; 358/213.22; 358/225
[58] Field of Search .................. 358/213.13, 213.19, 358/213.22, 213.25, 213.26, 225, 55, 909

[56] References Cited

U.S. PATENT DOCUMENTS 3,995,107 11/1976 Woywood ..................... 358/213.22
4,555,731 11/1985 Zinchuk ............................. 358/209

Primary Examiner—James J. Groody
Assistant Examiner—Robert M. Bauer
Attorney, Agent, or Firm—Rosenblum, Parish & Bacigalupi

[57] ABSTRACT

A highly controllable video camera is disclosed which includes an image intensifier for collecting light reflected or emitted from an object for a short period of time and developing a luminous image of the object which is communicated to a completely exposed CCD image sensor over a second period related to the decay rate of the light emitting phosphor screen of the image intensifier, the type of photograph being taken and the desired image quality. The CCD subsequently develops the light focussed thereon into electrical signals representative of the object. The electrical signals collected within the CCD are serially read from the CCD by a readout processing control and the discrete signals are alternately switched into ODD and EVEN memory banks for storage in a pattern which will facilitate producing an interlaced video signal from the output of the memories. A playback processing control reads the signals stored in the ODD memory and communicates an appropriate series of signals for display on a video display device as the first field of an interlaced image. Upon completion of reading the ODD memory bank, read-out is switched to the EVEN memory bank, and the playback processing control reads the signals stored in the EVEN memory bank and communicates an appropriate series of signals for display on the video display device as the second field of the interlaced image, such that a standard interlaced TV signal is reproduced.

32 Claims, 8 Drawing Sheets

HIGH-SPEED FULL FRAME IMAGING CCD CAMERA

BACKGROUND OF THE INVENTION

1. Field of the Invention

This invention relates generally to scientific and industrial cameras, and more particularly, to a highly controllable video camera that utilizes a charge coupled device (CCD) image sensor, or other solid state image sensor, configured in either a full or partial exposure mode, in combination with an electronic memory to produce an electronic representation of an object for transmission to a video display device or a digitally responsive device.

2. Brief Description of the Prior Art

The use of CCD or solid state imaging devices in place of film in cameras is well known, as is shown in Ochi et al, U.S. Pat. No. 4,541,016, issued Sept. 10, 1985. In general, CCD cameras are comprised of optical lenses that focus light from an object on to a CCD, whereupon the light is converted into electrical charges or electrical signals that are transferred from the CCD for display on a video unit.

A CCD is comprised of a pattern of closely spaced light sensitive image collecting elements or electrodes disposed on, and electrically isolated from, the surface of a semiconductor material. When proper voltages are applied to the electrodes, potential wells, capable of holding and transferring separate charges are formed under the electrodes. When the semiconductor material is exposed to light, near where such a potential well is formed, charge carriers generated by the light are collected and held in the potential well.

The charge collected in each potential well is representative of a pixel of information related to the light from the object focussed on the CCD. A typical CCD may be comprised of as many as 576 horizontal lines of 386 electrodes, more or less. However, as will be seen below, only about half of these number of horizontal lines of electrodes are used for imaging purposes by prior art frame transfer CCDs. The electrodes of the CCD are typically separated in a three-phase electrode structure, as is shown by Bixby, U.S. Pat. No. 4,338,514, issued July 6, 1982, but other electrode structures, such as two-phase or four-phase, could be adapted to achieve the same results. To transfer charges out of the CCD, adjacent electrodes are sequentially voltage pulsed between high and low levels, thereby line-by-line parallel shifting rows of charges to a read-out register within the CCD. As each row is transferred into the read-out register of the CCD, each pixel of information in that horizontal row is serially transferred from the CCD.

To create an interlaced picture using prior art frame transfer devices, as is required for TV or video display, charges are first collected under only one of the phase electrodes in the image section, after collection, the charges are shifted into a separate temporary store (which forms the remainder of electrodes in the CCD and reduces the available imaging area by at least half) and then shifted line-by-line from the store for output from the CCD. When the CCD is emptied, the drive pulse sequence of the image section is then modified so that the remaining portion of the image can be collected under the second and third phase electrodes, at which point these additional charges are transferred from the CCD. The first charge collecting period, or exposure, will form a first odd field of the interlaced image and the second charge collecting period will form a second even field of the interlaced image, as is required for video display. Thus, each image produced by prior art cameras requires two separate exposures (an odd and even field) of the CCD in order to recreate an interlaced TV signal, while requiring half of the imaging area of the CCD for non-imaging purposes.

Other applications have attempted to recreate the interlaced signal by increasing the image area of the CCD, so that an image passed across a frame transfer type CCD can be imaged by the CCD a number of times during each exposure, such as in Dillon et al, U.S. Pat. No. 4,338,634, issued July 6, 1982. However, such applications require a larger CCD imaging area, and the transfer timing for the electrodes must be synchronized with the speed of the image, giving such applications very limited utility.

To fully utilize the high-speed transfer characteristics of a CCD imaging camera, a wide variety of mechanical or electromechanical shutters and diaphragms have been developed. Prior art CCD cameras utilizing such devices have been able to achieve shutter speeds as high as 12,000 frames per second (with split-screen playback) or one frame approximately every eighty-three microseconds. See, Hyzer, *The Spin Physics Sp-2000 Motion Analysis Systems*, PHOTOMETHODS, May 1981. See also, Lloyd et al, U.S. Pat. No. 4,131,919, issued in December of 1978 disclosing an electronic still camera wherein the image and light exposure of the CCD array is controlled by a conventional photo-electric circuit which also controls the diaphragm aperture positioned in front of the array.

At faster frame rates, prior art exposure control devices have been found to be incapable of providing sufficient light (by means of opening the diaphragm) to match the shutter speed. To overcome this problem, a strobe light has been used in synchronism with the shutter to increase available light during an exposure period. However, strobe lights, as well as other light sources, can not be sufficiently controlled so as to inhibit incident light from reaching the CCD and being converted into unwanted information that is transferred along with wanted information as noise. Incident light noise, along with any charge left over in the electrodes during transfer, is known as smearing or blooming. Various devices have been developed to suppress smearing/blooming, such as is shown in Levine, or Akiyama, U.S. Pat. No. 4,233,632, issued Nov. 11, 1980.

SUMMARY OF THE PRESENT INVENTION

In view of the foregoing, it is an object of the present invention to provide a highly controllable CCD camera which can utilize the entire potential imaging area of the CCD to produce an electronic representation of an imaged object for transmission to a video display device or a digitally responsive device.

Another object of the present invention is to provide a highly controllable CCD camera in which the interlaced fields created for transmission to the video display device are produced without requiring odd and even field exposures of the CCD.

Another object of the present invention is to provide a highly controllable CCD camera which serially outputs successive rows of electrical signals to either of two alternately selected memories for storage and which outputs the signals thus stored in the first memory to create a first field and thereafter outputs the signals stored in the second memory to create a second field, so as to create an interlaced video signal.

A further object of the present invention is to provide a novel highly controllable CCD camera which utilizes a highly adjustable electronic image intensifier which provides exposure time control and light intensity control.

A still further object of the present invention is to provide a highly controllable CCD camera in which only a portion of the light sensitive elements are exposed to incoming light to facilitate high-speed imaging of an object.

An additional object of the present invention is to provide a highly controllable camera which can recreate a multiple-exposure, stop-motion image of a moving object.

Briefly, a preferred embodiment of the present invention includes an image intersifier for collecting light reflected or emitted from an object for a short period of time and developing a luminous image of the object which is communicated to a completely exposed CCD image sensor over a second period related to the decay rate of the light emitting phosphor screen of the image intensifier, the type of photograph being taken and the desired image quality. The CCD subsequently develops the light focussed thereon into electrical signals representative of the object. The electrical signals collected within the CCD are serially read from the CCD by a readout processing control and the discrete signals are alternately switch into ODD and EVEN memory banks for storage in a pattern which will facilitate producing an interlaced video signal from the output of the memories. A playback processing control reads the signals stored in the ODD memory and communicates an appropriate series of signals for display on a video display device as the first field of an interlaced image. Upon completion of reading the ODD memory bank, readout is switched to the EVEN memory bank, and the playback processing control reads the signals stored in the EVEN memory bank and communicates an appropriate series of signals for display on the video display device as the second field of the interlaced image, such that a standard interlaced TV signal is reproduced.

These and other objects and advantages of the present invention will become apparent to those skilled in the art after having read the following detailed description of the preferred embodiment illustrated in the several figures of the drawing.

DESCRIPTION OF THE PREFERRED EMBODIMENT

Figure 1:
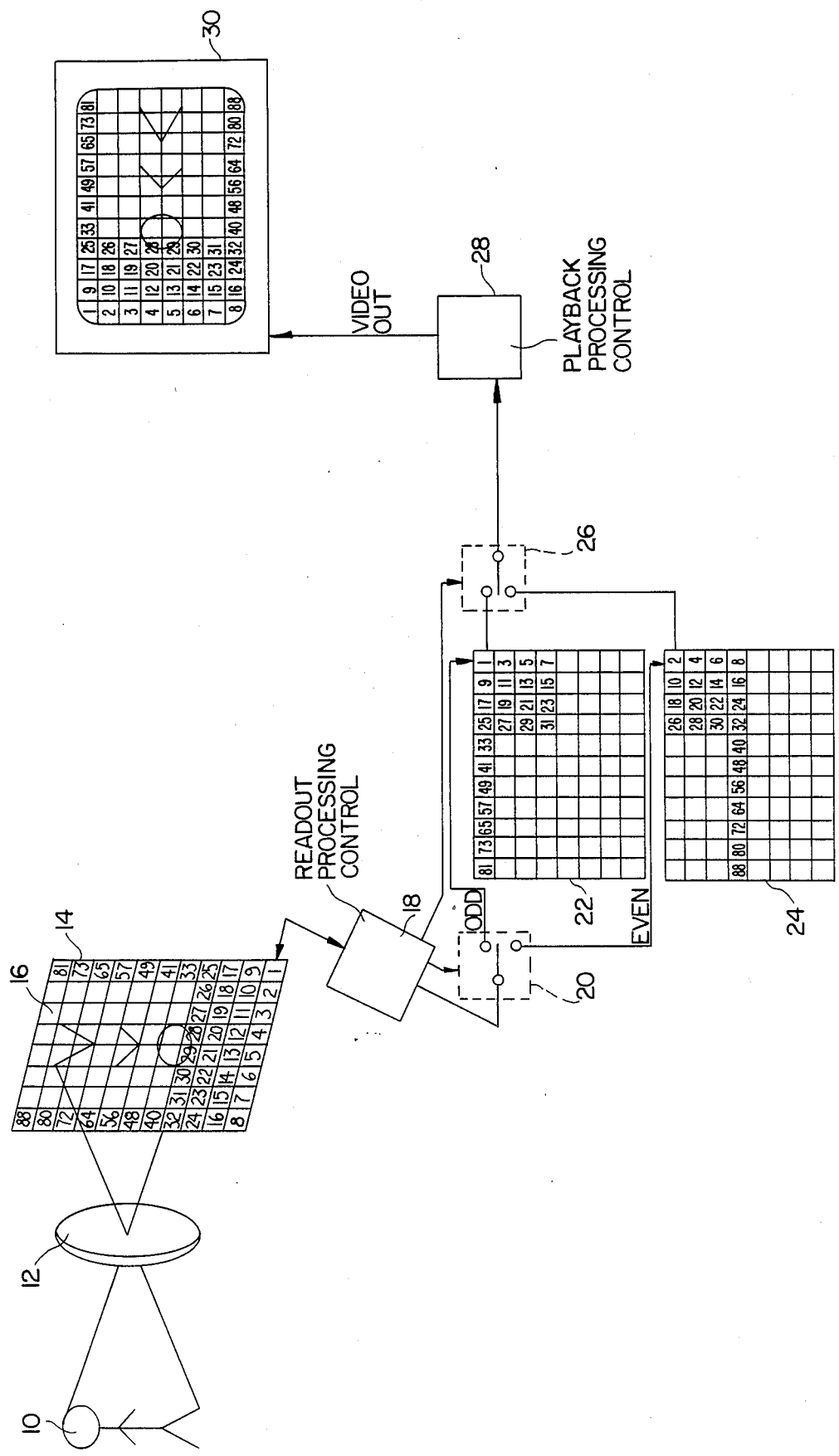
FIG. 1 is a diagram schematically illustrating the image capture and playback operation of a preferred embodiment of the present invention.

In reference to FIG. 1 of the drawing, a schematic illustration of the image capture and playback operation of the present invention is shown. Light emitted by or reflected from the stick FIG. 10 is communicated through the imaging control 12 (shown as only one lens) to a CCD 14. The imaging control 12 causes the stick FIG. 10 to be projected as a mirror image onto CCD 14. In the context of the preferred embodiment, only a frame transfer CCD may be used, however, imaging readout and playback features of the present invention could be modified to accommodate a variety of other types of CCDs and similar imaging devices.

The frame transfer CCD is primarily comprised of a plurality of separate light sensitive image collecting elements or electrodes 16, each of which collect the incoming light and convert the light to voltage charges or electrical signals representing a pixel. In FIG. 1, for illustrative purposes only, the CCD is shown as a rectangle having 8 columns by 11 rows of electrodes which form the 88 pixels that form an electronic image of the light focussed thereon. Although other types of CCDs could be used, scientific type CCDs having square pixels are preferred because of the square pixel's adaptability to metrology. Although shown as a rectangle, the CCD, or other form of imaging device, may be in the shape of a square, circle, oval, etc., and the imaging area of the CCD may be very large, such as capable of representing hundreds of thousands, or even millions of pixels, provided that the imaging area is divisible into some form of orthogonal rows and columns of pixels for address purposes.

After light from the object has been sufficiently focussed upon the CCD during the standard imaging mode, light will be inhibited from entering the camera by imaging control 12 (discussed in detail below), and the CCD will begin outputting electronic signals, proportional to the light focussed upon each CCD element, to the readout processing control 18, which processes the signals from the CCD for storage in memory, and controls the storage timing sequence. As each pixel is transferred by readout control 18, an input switch 20, which may be either a mechanical or electrical switch, is toggled, such that pixel 1 is stored in the ODD memory bank 22 and pixel 2 is stored in the EVEN memory bank 24. Alternatively, pixels may be transferred by readout control 18 to any type of memory or store, from which the pixels may be subsequently read in the appropriate sequence. This storage sequence is repeated for all of the pixels in row 1. Row 2 is then shifted down (or up) in place of row 1, and the storage sequence is repeated for row 2. Odd/Even separation of pixels is continued in this fashion until every pixel of every row has been communicated to a corresponding memory site. The pixels are either stored in the Odd or Even memory in descending order in the columns of the memory. Thus, pixel 1 is stored in a memory site corresponding to Column 1, Row 1 of the Odd memory and pixel 3 is stored in a memory site corresponding to Column 1, Row 2, etc. The end of a row of pixels in the CCD corresponds to the end of a column of memory sites in the memories 22 and 24.

Once that the CCD 14 has completely output the electrical signals developed by each element, and the signals have been stored in memories 22 and 24, the signals are read from the memories in order as a serial stream of information that is compatible with the interlaced signal (raster scan) required for display on a standard video display device. By sequentially reading each horizontal line from the Odd memory 22 until all Odd memory has been read out (creating the first field of the interlaced signal) and then switching output switch 26 to the Even memory 24, and sequentially reading each horizontal line of Even memory 24, until all Even memory has been read out (creating the second field of the interlaced signal), it is possible to recreate an interlaced image on television/video monitor 30. To facilitate a standardized video signal, information readout of memories 22 and 24 must first be processed by playback processing control 28 to form compatible signals for television transmission or video display.

It will be appreciated that pixels stored in either memory 22 or 24 could be stored and read out as either sequential vertical columns, horizontal rows, or some other sequence, as long as the output forms a serial stream of information that can be easily adapted for playback and display as an interlaced image. When pixels are stored and played back as depicted in FIG. 1, the interlaced image is translated 90 degrees, thus either the CCD 14 or the screen of the monitor 30 may need to be rotated by 90 degrees to depict the image as represented in real life. However, it will be appreciated that the translation of the CCD or the monitor is merely a function of the storage sequence and can be adapted as necessary. Most applications do not require the image to be played back as naturally occurring, as will be shown below, nor would rotating the CCD or the screen be a hindrance for most users.

Figure 2A:
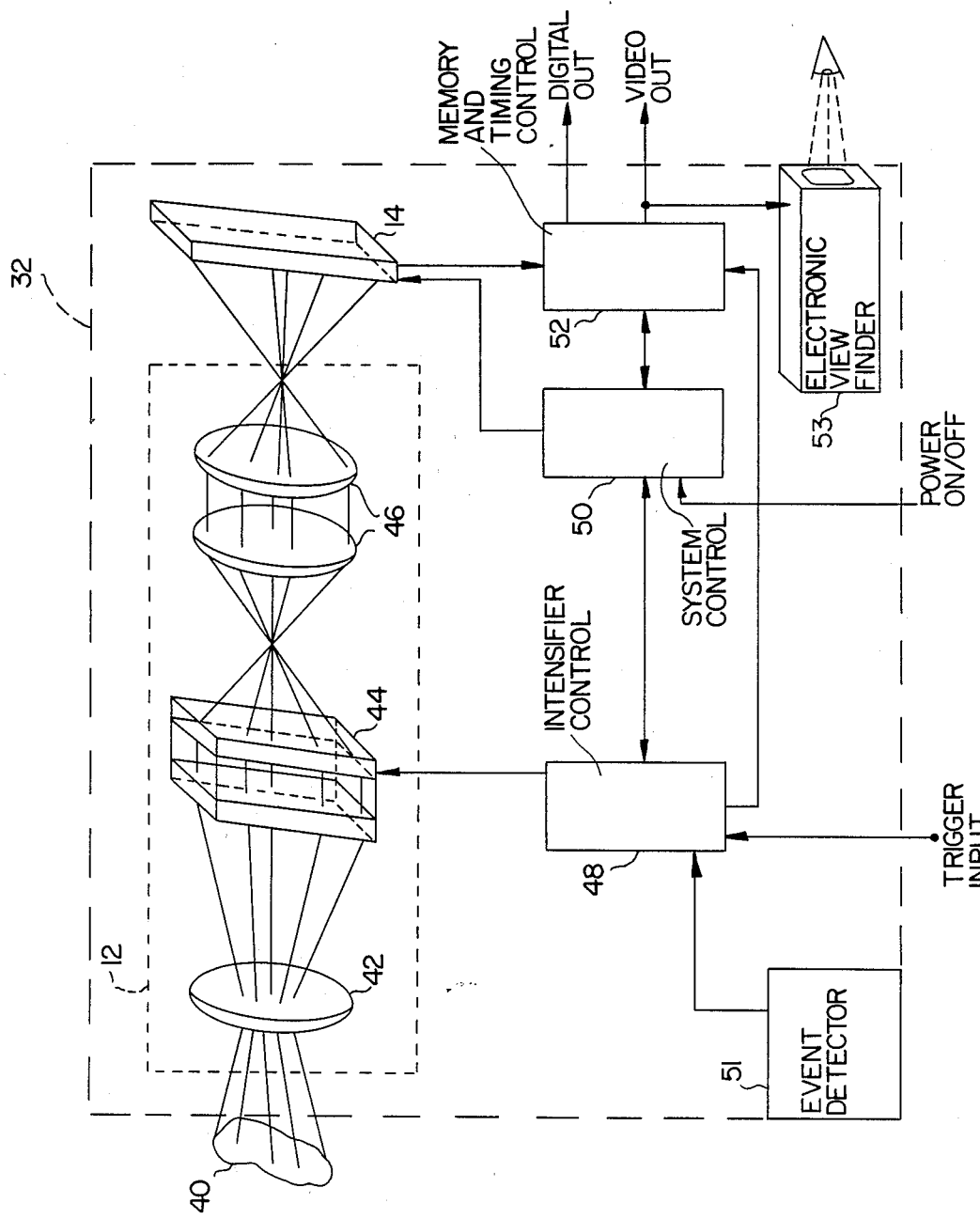
FIG. 2A is a block diagram schematically illustrating the principal functional components of a preferred embodiment of the present invention.

A block diagram schematically illustrating the principal functional components required to produce a camera 32 in accordance with the present invention is shown in FIG. 2A. Light from object 40 is communicated through an object lens 42 to an image intensifier 44, which functions as both a shutter and light intensity control by controlling the length of time that light is allowed to pass through the intensifier as well as the quantity of light passed therethrough. Light passing through the intensifier 44 passes through additional focussing lenses 46, or a fiber optic coupling device, and on to the CCD 14.

The intensifier 44 is a micro channel-plate (MCP), proximity focussed intensifier, (although other types could be used) the operation of which, is controlled by an intensifier control 48. System control 50, which controls the supply of power to the camera 32 by the power on/off line, also controls the output sequence of electrical signals from the CCD 14. Signals read from the CCD 14, under the direction of system control 50, are separated and stored by a memory and timing control 52, which stored each pixel read from the CCD 14 in an appropriate memory bank or store, as shown in FIG. 1, and prepares and controls the subsequent output of such information to monitor 30 via the video out line. The picture or image being transmitted through the video out line may continuously be displayed by an electronic view finder 53 or monitor by cycling the memory for repeated output of the same information. In addition to the video output, a digital output may also be provided for digital storage or use by a digitally responsive device.

Intensifier control 48 typically functions much the same as the trigger and exposure control settings of the standard consumer camera. In other words, camera 32 may be triggered manually by a user (or computer) through the trigger input line, an adjustable delay may be provided after the triggering and before turning on the intensifier, and the length of time during which the intensifier 44 is operated may be manually or electrically controlled. In its typical application, the camera starts imaging sometime prior to the actual occurrence of the desired event to assure that the event is captured. For highly controllable events, this may be easily accomplished, but for uncontrollable events, the camera may be running for a relatively long period of time capturing useless information prior to the events occurrence.

In the preferred embodiment, the system control 50 may be set to either be idle once power is supplied, or to cause the CCD 14 to operate in a clearing mode which will be described below. If the system control 50 is set to be idle on power up, the trigger input may be used to start the clearing mode until either an event is detected by event detector 51 (if desired) or until a delay period has passed, the occurrence of either of which causes intensifier 44 to be turned on.

Figure 2B:
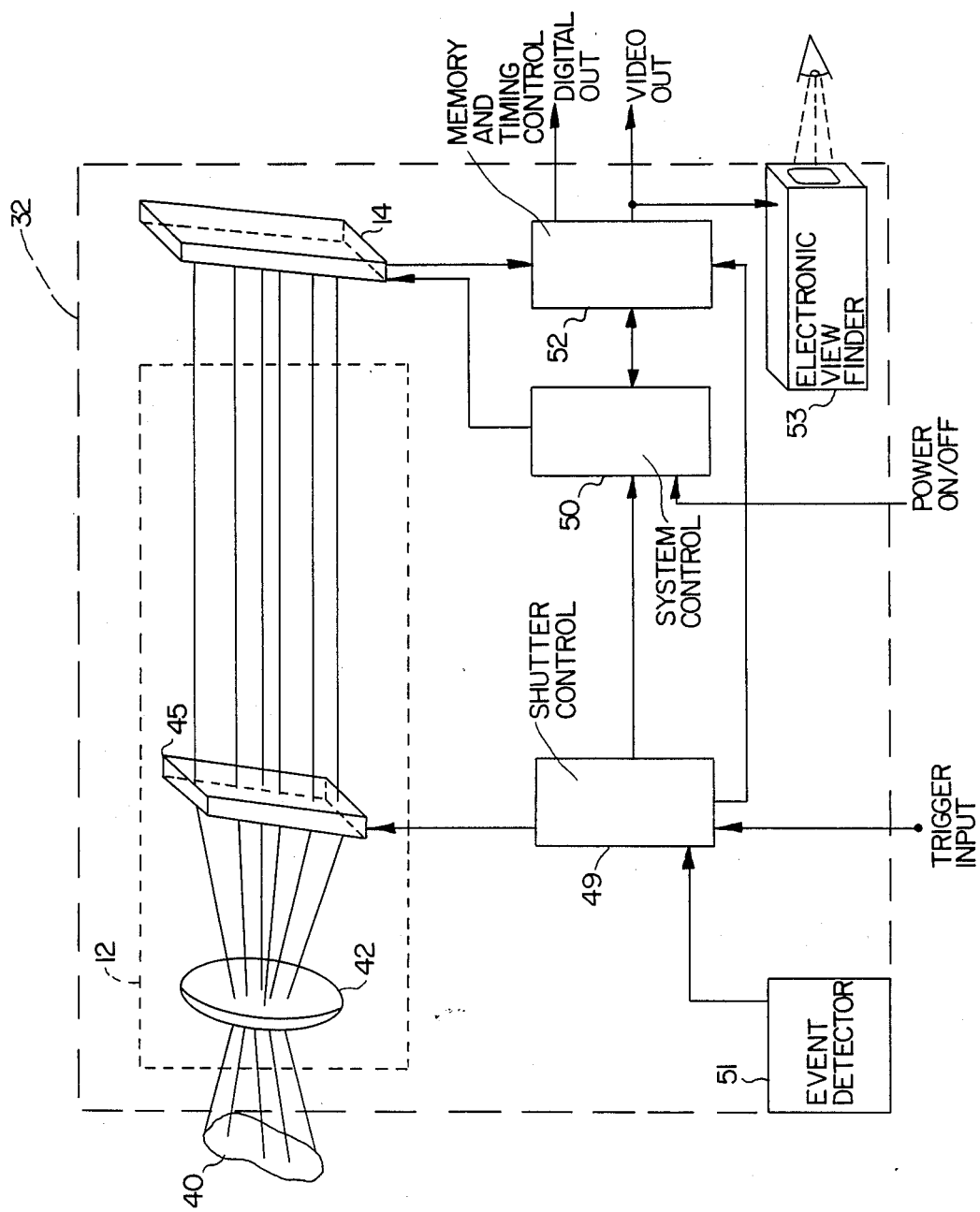
FIG. 2B is a block diagram schematically illustrating the principal functional components of an alternative embodiment of the present invention.

An alternative embodiment of the present invention, which provides for more accurate triggering control, is depicted in FIG. 2B. Imaging control 12, in this alternative embodiment, is reduced to a single object lens 42 and a shuttering device 45. In addition, intensifier control 48 is replaced by shutter control 49, which functions much the same as intensifier control 48, except that it controls an electrical or mechanical shutter rather than an intensifier. Once again, either power up or the trigger input may be used to start the clearing mode. If the trigger input is used, the trigger may be delayed for short period and then used to operate the shutter, or the shutter may be activated by event detector 51. Likewise, the trigger may be used to start the clearing mode and then start a delay period, which upon completion, results in the shutter being activated, or which may be overridden by the even detector 51. A number of different combinations can be used depending upon the event to be captured. Once such application would be the capture of an expected explosion at an unpredictable time.

To capture the event, camera 32 is placed in line to view the expected explosion and is turned on with the system control 50 in the idle mode. The trigger input is then used to open the shutter and start the clearing mode without further delay. Upon the occurrence of the explosion, even detector 51 signals the system control to stop the clearing mode and capture the event. Because shuttering device 45 is left open (which in addition makes the use of a shutter in, at least, this application unnecessary), and very little electronic delay is involved, the event may be captured from its start without also capturing additional useless information. The event detector 51 may also be used in this embodiment to signal the system control that the event has finished. It will also be appreciated that any of a larger number of similarly different methods not shown herein may be devised to trigger actuation of the clearing mode and imaging in accordance with the present invention.

Figure 3:
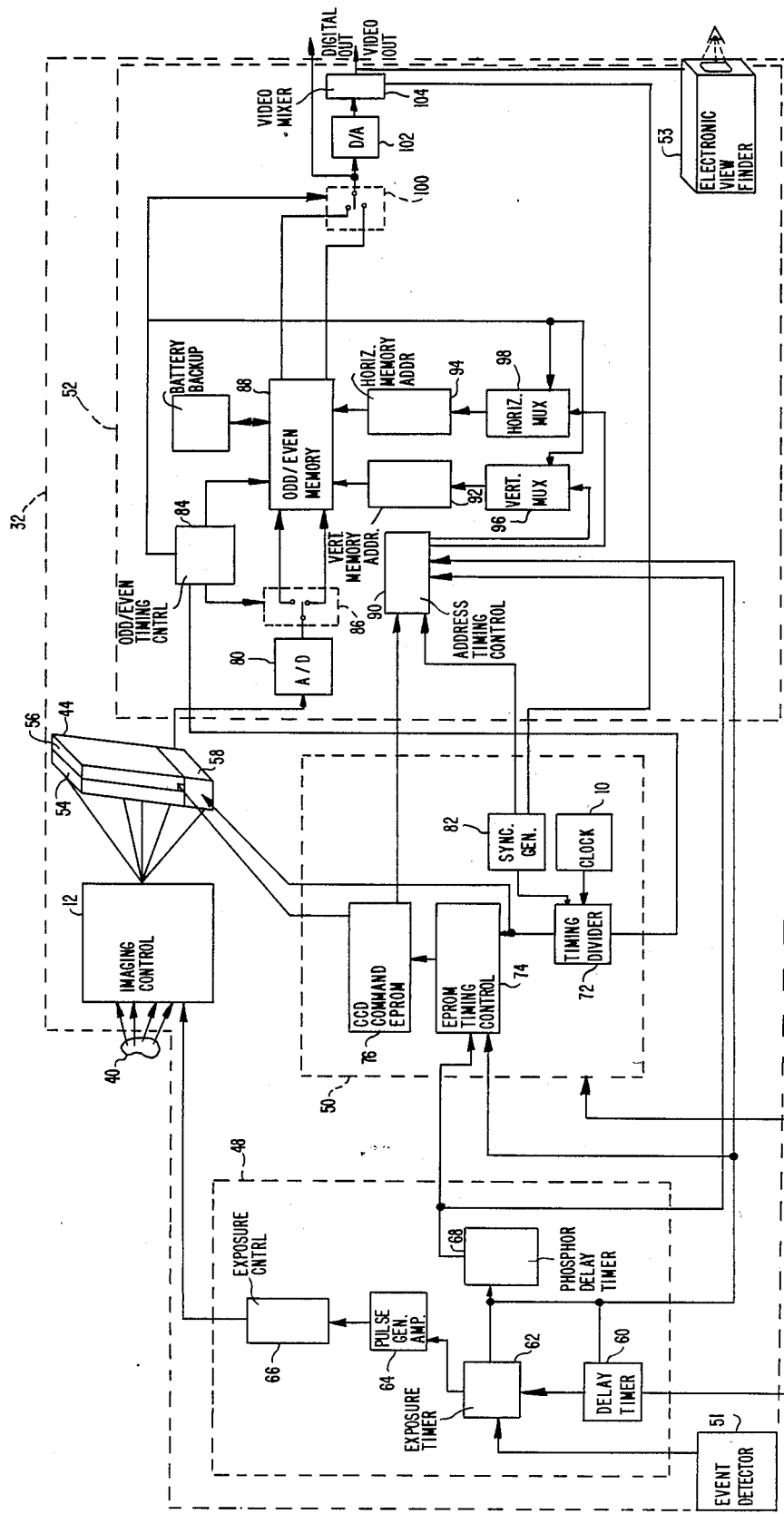
FIG. 3 is a block diagram further illustrating the functional components depicted in FIG. 2A.

FIG. 3 is a block diagram further illustrating the function of intensifier control 48, system control 50 and the memory and timing control 52 of the preferred embodiment of the present invention. The exposure of the CCD 14 to light admitted through intensifier 44 is regulated by intensifier control 48. The trigger input line activates the delay timer 60, which may also be manually or electronically controlled, and carries out two functions. One function is to delay the start of the clearing mode after the trigger for one period, and the second function is to delay the start of imaging for a second period. If both the first and second periods are zero, the intensifier is turned on soon after the trigger input. If the first period is shorter than the second period, the camera will operate in the clearing mode between the end of the first period and the end of the second period. If both periods are equal, the intensifier is turned on at the end of the first period. Where the two periods are both zero or otherwise equal, it may be necessary to set the system control to activate the clearing mode on power up and to disable that function of the trigger.

The event detector 51 may be used to either override the second delay period or to replace that function of the trigger. If the exact time at which the event will occur is unknown, but it is desirable to start the clearing mode with the trigger, the second period can be set for some infinite period of time and the event detector can be used to activate the intensifier. Regardless of whether the delay timer 60 or event detector is used to activate the intensifier, the process is started by sending a signal to the exposure timer 62, which may also be manually or electrically controlled. The exposure timer 62 then directs a signal (the length of which determines the length of exposure) to the pulse generating amplifier 64, which generates an equivalent pulse for causing the exposure control 66 to develop a positive 200 volt pulse for application to the imaging control 12. Exposure control 66 is comprised of a transistor combination capable of creating a negative voltage swing in the intensifier 44.

The photo cathode of the intensifier is typically biased to negative 600 volts with respect to the MCP input, which causes it to inhibit the passage of light through the intensifier. However, increasing the operating potential between the MCP and the photocathode to negative 800 volts permits the passage and intensification of whatever light is admitted. By raising the intensity of the available light reflected or emitted from the object 40, there is no need for a traditional diaphragm or, in most applications, separate lighting, such as strobe light. In addition, because all light is inhibited when the intensifier is turned off and the CCD is in a clear mode (as described below), incident light is not a problem, thereby eliminating the requirement for additional smearing/blooming control electronics. By varying the transistor combination, such as by using avalanche transistors, the shutter speed may be increased to as fast as 5 nanoseconds or faster. At the same time the signal is generated by exposure timer 62 to the pulse generating amplifier 64, a signal is also sent to system control 50 and memory and timing control 52 to prepare the system for picture capture, or integration.

Although light is inhibited from entering the intensifier when the voltage potential rises to negative 600 volts, and the imaging area 54 of the CCD 14 is darkened, the phosphor screen of the intensifier 44 will continue to show the image for a period of time thereafter, which is known as the phosphor decay period. Accordingly, an additional phosphor decay timer 68 is switched on when the exposure timer turns off, whereby providing an additional delay necessary for the phosphor screen to finish decaying the recently intensified image. The end of this second time period triggers system control 50 to begin reading out the image captured during the integration period.

Image intensifiers have been of practical use in prior art cameras utilizing light sensitive recording material, such as silver halide emulsion, because the recording material requires most of the exposure period (extra light) provided by the phosphor screen decay in order to record the image. However, image intensifiers have not been of practical use with CCD imaging devices in place of the film because CCDs do not allow the extended exposure period, and any image shifting occurring during phosphor decay would be considered incident light or noise. To avoid this problem, so that an image intensifier may be practically used with a CCD, the present invention links the timing characteristic of the two elements, such that exposure and aperture settings are made highly controllable.

Figure 4A:
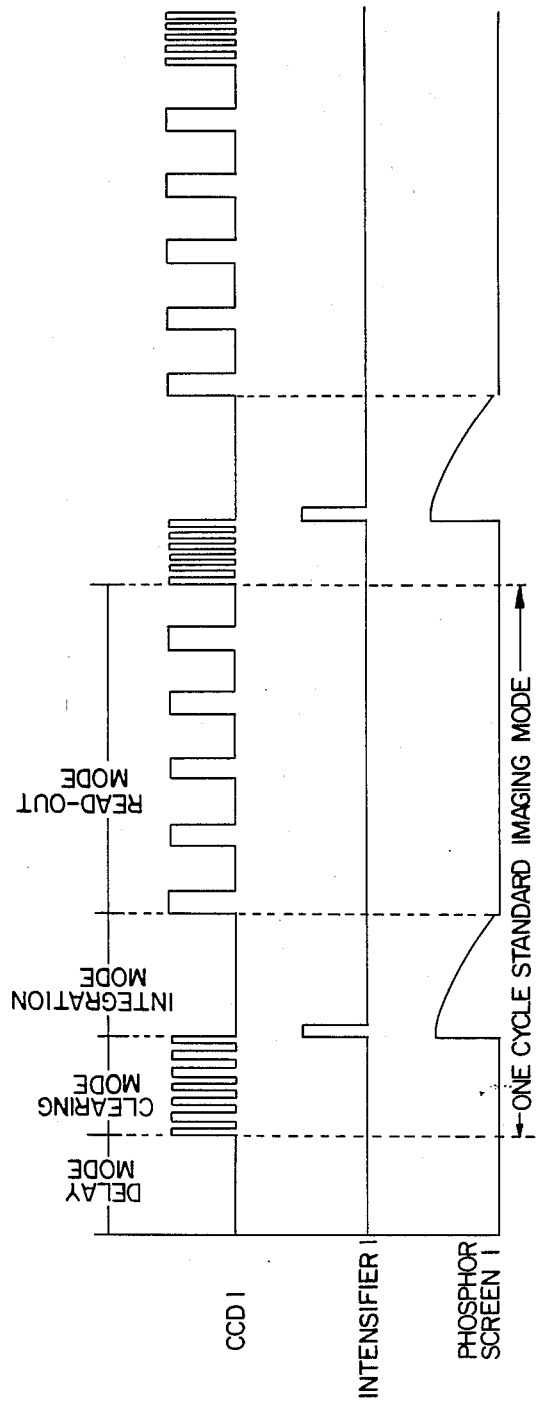
FIG. 4A and 4B are timing diagrams indicating the shifting sequence of the CCD, timing characteristics of the intensifier, and the decay rates of the phosphor screen during various modes of operation.

The general timing characteristics of the shifting sequences of the CCD, the intensifier, and the phosphor screen, as partially described above with regard to the standard imagine mode, are depicted in FIG. 4A. From the time when the camera is rendered operational, and during any period where the CCD is not collecting or reading out an image, the CCD may be operated under the previosuly mentioned clearing mode. In addition, as previously described, a delay period, or delay mode (which may be zero), may be provided by delay timer 61 prior to the clearing mode, as indicated by the line CCD 1 of FIG. 4A. During the clearing mode, charges collected by means of the electrodes of the CCD are continuously shifted down and eventually dumped to ground so as to keep the voltage charge collected by each electrode to a practical voltage of zero. The typical clearing frequency is approximately two megahertz, which translates into a shift pulse approximately every 500 nanoseconds. When an image is taken, the intensifier is turned on (admits light) for a very short period of time (the shutter period), such as the 5 nanosecond period described above, immediately after the clearing mode, as is shown by the line, Intensifier 1, in FIG. 4A.

Turning on the intensifier triggers the start of the previously mentioned integration period of the CCD. During the integration period, shown in FIG. 4A, the clearing mode is turned off so that electrodes may accumulate charges, and the intensifier is turned on and off, so that a certain quantity of light is collected. The intensifier is turned on for only a very small portion of the total elapsed time comprising the integration period. The exposure of light to the CCD, so that adequate charges representing the image can be collected, is carried out by the phosphor screen itself (shown as the line Phosphor Screen 1, in FIG. 4A), which continues to radiate light on the CCD during the decay period determined by phosphor decay timer 68, rather than attempting to collect sufficient light by leaving the intensifier on for a longer period of time. Hence, very quickly occurring events may be captured in crisp detail because only the image represented during the period in which the intensifier collects light, is exposed to the CCD. Prior art cameras using mechanical or electronic shutters, or even those using image intensifiers with film, require the shutter to be left open for much longer periods of time, so as to admit sufficient light into the camera.

Figure 4B:
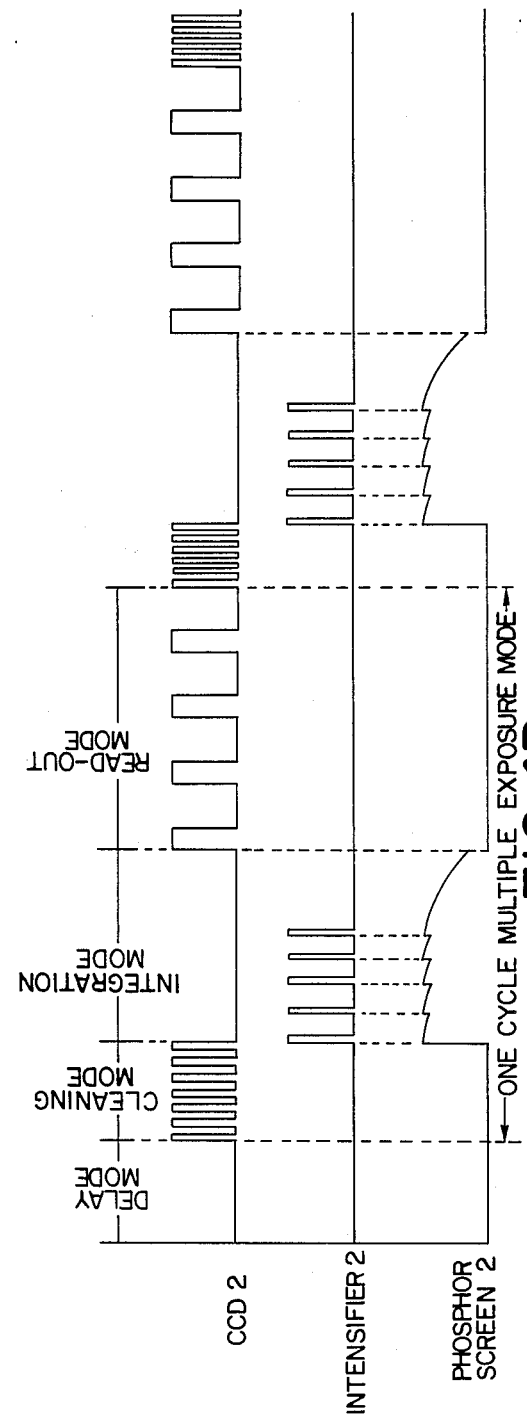

At the end of the integration period, approximately equal to 90 percent of the phosphor decay period, the CCD is operated in a read-out mode, which may be at any frequency within the capabilities of the CCD. When the collected charges representing the desired image have been completely read-out of the CCD, the CCD is then operated in the clearing mode until the next image is to be taken. This sequence may be repeated over and over as desired. Operating the intensifier and the CCD in such a fashion provides a highly controllable camera in which a rapid frame (picture) rate may be as easily obtained as a still life image. In other words, the intensifier may be turned on for a preselected period that is related to the type of photo being taken and in the image quality desired. Light radiated from the phosphor screen and the phosphor screen's associate decay rate may also be used in what is referred to as the mutliple exposure mode, which is depicted in FIG. 4B and which will be further explained below.

To furher understand the operation of the camera 32 during the clearing mode, integration mode and read-out mode, reference is made back to FIG. 3. Once the CCD 14 is actuated to operate in the clearing mode, the CCD 14 continues to operate in the clearing mode until the intensifier is turned on. Thus, the same signal which starts the phosphor decay period, starts the integration mode, and initializes the memory and timing control 52. At the end of the phosphor decay period, phosphor delay timer 68 signals EPROM timing control 74 to stop integration and start image read-out, and signals address timing control 90 to start memory addressing for pixels output from CCD 14. When CCD command EPROM 76 has read out the last horizontal line of pixels, a signal is sent to address timing control 90 to stop memory addressing.

When the camera 32 is rendered operational, clock 70 produces a continuous pulse signal that is divided by timing divider 72 and input to EPROM timing control 74. At the appropriate time, EPROM timing control 74 signals the CCD command EPROM 76, which may be any of a number of programmable control devices, that in turn signals the CCD, such that stored signals in the CCD's vertical transfer register 56 are vertically transferred (shifted) within the CCD to the horizontal register 58, where the signals are amplified and outputted to the memory and timing control 52. Horizontal register 58 is also synchronized with the EPROM timing control 74.

Pixels output from the horizontal register 58 are digitized by the analog to digital converter 80. A synchronous generator 82, or the clock 70, supply timing signals to divider 72, which supplies pulses to the ODD-/EVEN timing control 84, such that input switch 86 can separate odd and even numbered pixels for storage in the ODD/EVEN Memory 88. An additional timing control signal may be supplied to the address timing control 90 from the synchronous generator 82. Timing for the EPROM 76 may alternatively be provided by the synchronous generator 82 through the timing divider 72 and address timing control 90.

Address information for the storage of pixels in memory 88 is supplied by the vertical (Y) memory address 92 and the horizontal (X) memory address 94, which are controlled by the vertical multiplexer 96 and horizontal multiplexer 98, respectively. The multiplexers 96 and 98 receive timing and control signals from address timing control 90 and ODD/EVEN timing control 84.

When the electronic signals from the CCD 44 have been completely communicated to the memory 88, the information is read out of the memory 88, as described above, through output switch 100 to the digital to analog converter 102. If a digital output is desired, output switch 100 can directly output a digital signal. If an analog video signal is desired, the output of D/A converter 102 is then mixed by the video mixer 104 with a standard RS 170 synchronous waveform from the synchronous generator 82, to produce the video output signal. Once again, the picture or image transmitted by means of the video output signal may also be displayed continuously by electronic view finder 53.

Figure 5A:
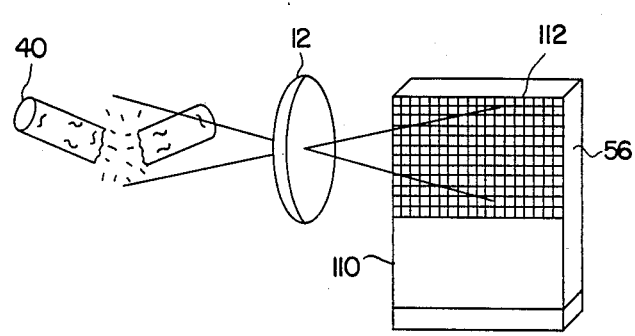
FIG. 5A is a perspectiveview depicting a charge-coupled device configured for the fast frame imaging of an object.
Figure 5B:
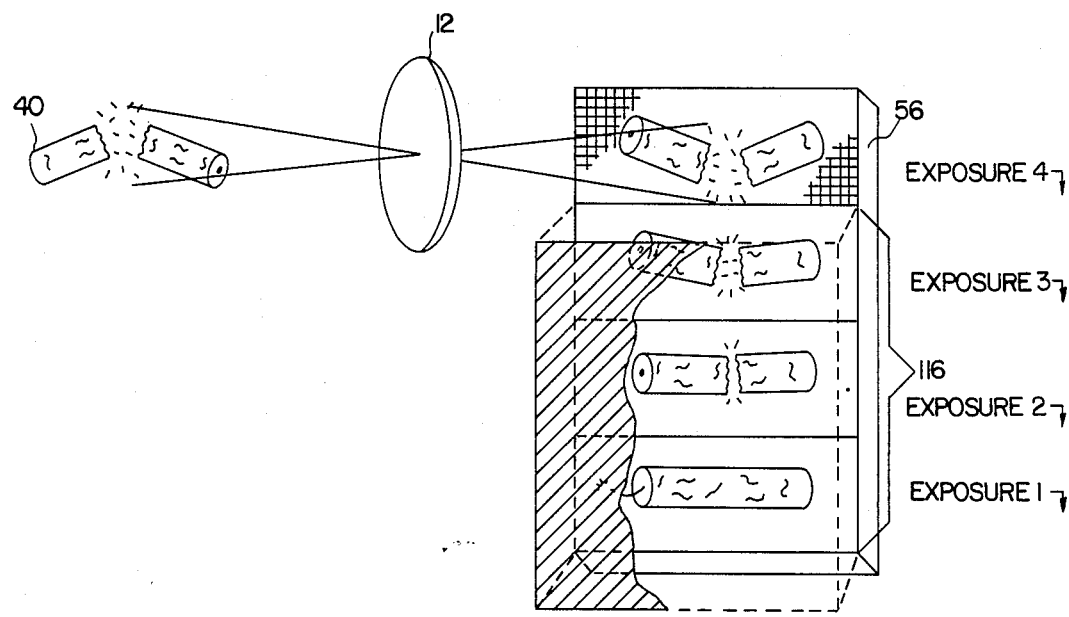
FIG. 5B is an exploded, partially cutaway perspective view of the CCD depicted in FIG. 5A further illustrating the operation of a preferred embodiment of the present invention in the fast frame imaging mode.

Referring now to FIGS. 5A and 5B, there are shown perspective views depicting a CCD 56, configured for imaging the object 40, wherein only a portion of the light sensitive array depicted in FIG. 1 is exposed. FIG. 5A shows approximately half of the horizontal rows of pixel forming elements covered by a light inhibiting cover 110. Covering a portion of the imaging area 112 enables the camera 32 to be used for a number of unique applications, such as the fast frame mode, which may be best described by referring to FIG. 5B.

The exploded view of FIG. 5B depicts the CCD of FIG. 5A with an image of the object 40 projected upon the exposed elements of the CCD. The image of the object would not actually be visible as shown in FIG. 5B. The image of the object would actually be translated into charges, collected within each element, representing the image. Under the masked area, shown by the bracketed area 116, are a series of previously projected images that were captured during the period in which the event depicted occurred and was projected through the lens 12 onto the CCD. The depictions Exposures 1–4 show the order by which the different pictures of the object 40 were captured. Arrows are utilized to illustrate that Exposure 1 was taken when the firecracker was unexploded and still being imaged upon the exposed CCD area currently occupied by Exposure 4. The object 40, represented as a fire-cracker, is shown as it would appear over time after the fuse 120 had been lit and the fire-cracker had begun to explode.

Note that a number of horizontal rows and columns representing the exposed elements are depicted in two of the corners to show the relationship between the object focussed on the CCD and the image to be displayed on the monitor. When an image is taken, charges are developed in the exposed are and transferred to the masked area, and because less is being transferred after each exposure, the frame rate can be faster than a fully exposed CCD. Imaging the occurrence of a rapidly changing event such as this permits analysis of the action, such as the explosion and particle fragmentation of the firecracker, to a degree previously unachievable by a video camera.

Figure 6C:
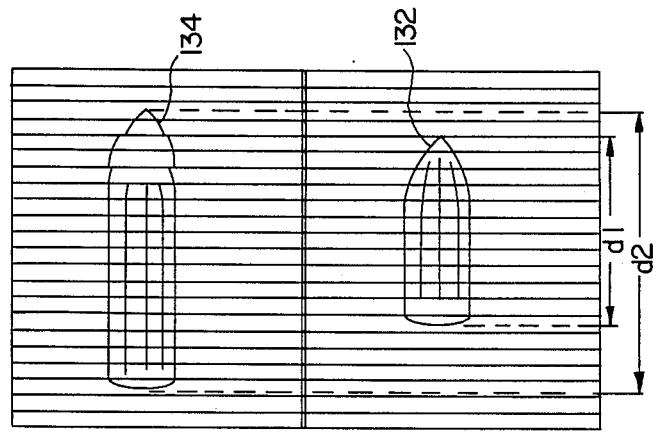
FIG. 6C is a pictorial view used to further illustrate an application of the preferred embodiment of the present invention in the synchro-ballistic mode.
Figure 6B:
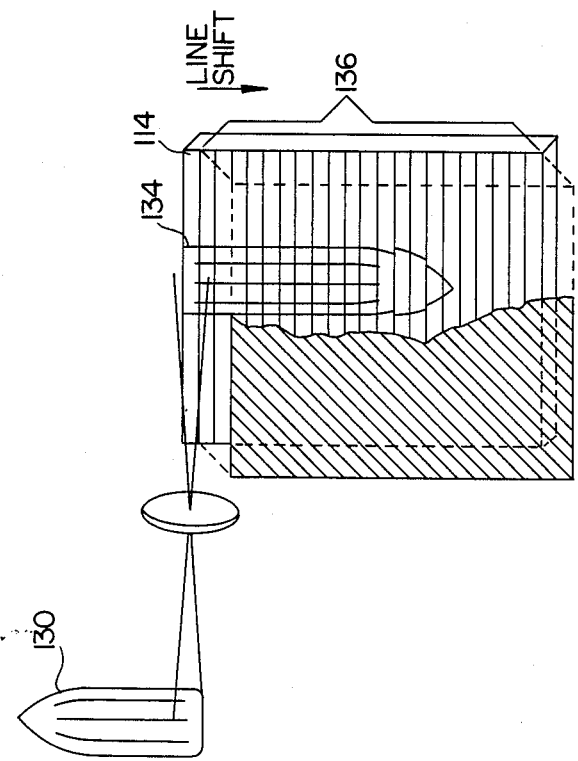
FIG. 6B is an exploded, partially cutaway perspective view of the CCD as configured in FIG. 6A illustrating the operation of a preferred embodiment of the present invention in either the synchro-ballistic mode or the streak mode.
Figure 6A:
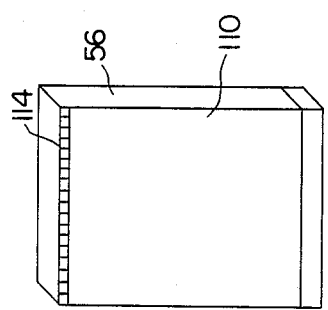
FIG. 6A is a perspective view depicting a charge-coupled device configured for imaging exposure of one horizontal line of the light sensitive array.

An illustration of the operation of the present invention in either the synchro-ballistic mode or streak mode can be depicted by FIGS. 6A, 6B and 6C. This application utilizes the camera 32, configured as shown in FIG. 6A wherein all but one row of elements 114 are covered by the inhibiting cover 110. An application of the synchro-ballistic mode or streak mode is shown in FIG. 6B where bullet 130, or other projectile, of a known length, is fired past the camera. If it is possible to estimate the speed of the bullet 130 prior to its firing, the shuttering rate of the camera 32 can be set accoridngly. Depending upon whether the shuttering speed, or imaging speed, of the camera is faster or slower than the speed of the bullet, the recorded image of the bullet under the synchro-ballistic mode will be longer or shorter than the actual size of the bullet. Thus, the actual speed can be determined by measuring the difference in sizes, given a known imaging speed.

If it is not possible to gauge the speed at which the object will pass and only an image is desired, regardless of it's timewise appearance, the camera may be operated in the streak mode. Images taken in the streak mode, at their best would appear similar to the image shown in FIG. 6B, and more than likely would be much more streaked, or disfocussed. In addition, in the streak mode, the images may be taken longrithmically rather than linearly. In contrast, if the speed of the imaging can be made equal to the velocity of the bullet, then the imaged bullet will be the same as the actual size of the bullet. If the imaging speed of the camera is faster than the velocity of the bullet, a greater number of line exposures will be taken of the bullet as the bullet makes it's pass than could have otherwise have been taken and which when collected as an image, as depicted in the exploded view in FIG. 6B, depict the bullet to be longer than its actual size. Once again, the bracketed area 136 is masked so that only the single row of elements 114 are exposed to light. The cover 110 is cut away to show how the image would appear if visible on the surface of the CCD.

The amount of time required to image an object onto the CCD, capture the light representing the image in the electrodes, and shift the captured charges under the cover 110 may be as short as one microsecond. When the CCD is masked as depicted in FIGS. 6A and 6B, distinct frames or pictures may be taken at speeds exceeding that of the bullet as is shown in FIG. 6B. Thus, an image of the actual size of the bullet 132, as shown in FIG. 6C, may be compared to the imaged size of the bullet 134. Both the actual size of the bullet and the imaging speed of the camera are known, thus, if the length of the bullet 132, d1, is substracted from the imaged size of the bullet 134, d2, the resultant value would be directly proportional to the velocity of the bullet.

Another application of the present invention would be to leave the CCD either partially or fully exposed, and shutter the intensifier repeatedly while imaging the object, but not transferring the lines of pixels after each exposure. The resulting image would be a multiple exposure stop-motion representation of the object. Alternatively, if an intensifier is not incorporated in the device, such as is depicted in FIG. 2B, and the object is illuminated by a high speed strobe or other exposure time determining element, the same result can be achieved.

As was discussed above in reference to FIG. 4, the normal timing characteristics of CCD exposure entail turning the intensifier on once at the beginning of each integration period and allowing light radiated by the phosphor screen to replace light traditionally admitted through an open shutter. To create a multiple exposure stop-motion representation of an object, or "Cybervision" type image, the timing sequence is modified so that the intensifier is turned on and off a number of times during the integration period, as shown by the timing line, Intensifier 2, of FIG. 4B. In response to the intensifier being turning on and off, the phosphor screen is charged with light and then begins to decay as shown by the timing line, Phosphor Screen 2 of FIG. 4B. If the intensifier was to be turned on and off again shortly after the first time, the phosphor screen would be recharged and rebegin to decay, causing the phosphor decay timer to be restarted over and over. This process is repeated as many times as desired until the end of the integration period. The resultant image produced by operating the camera in such a fashion can be illustrated by FIG. 7.

Figure 7:
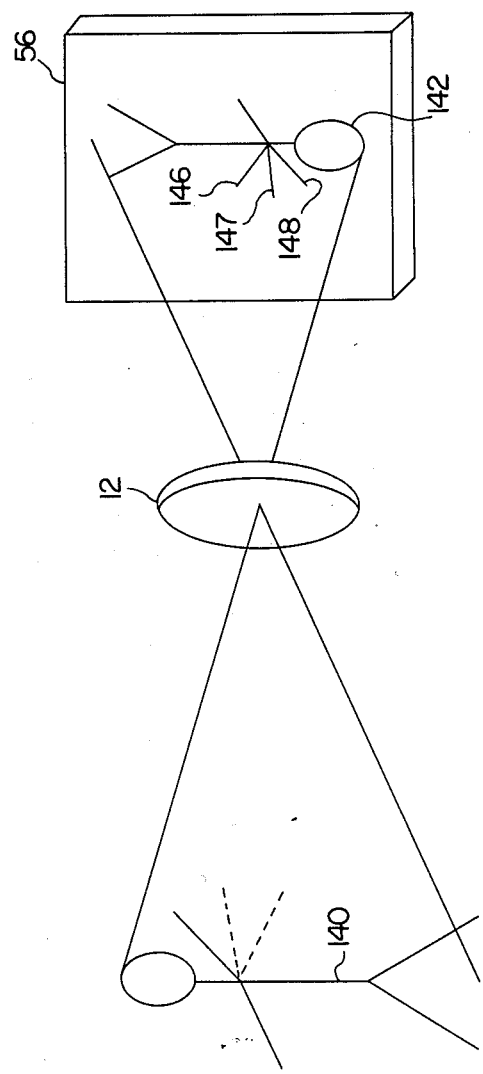
FIG. 7 is a diagram illustrating the mutliple exposure mode of a preferred embodiment of the present invention.

The real life stick FIG. 140 of FIG. 7 is shown with one arm raised up near its head and the two former positions of the same arm indicated by two separate dotted lines, such that the stick FIG. 140 is depicted as raising the arm. If the intensifier was turned on and off a number of times during the integration period of the CCD, as shown in FIG. 4, while the stick figure was moving the arm, an electronic representation of the image as captured by the CCD would be visually depicted by the imaged stick FIG. 142. Each time the phosphor screen is charged or recharged when the intensifier is turned on, causes a slightly different figure to be radiated by the screen onto the CCD.

It should be noted, that the CCD is not being cleared of charges during the second period, so the original position of the arm 146, will continue to be represented as the second position of the arm 147 and final position of the arm 148 are captured. Imaging in this fashion would be similar to a type of photography known as "Cybervision", which is often used for showing athletes in slow motion.

It is anticipated that other embodiments and/or alterations or modifications of the present invention will become apparent to those skilled in the art after having read this disclosure. Accordingly, it is intended that the following claims be interpreted to cover all such alterations, alternatives or modifications as fall within the true spirit and scope of the invention.

What is claimed is:

1. A highly controllable video camera for capturing light from an object and developing corresponding electrical signals from which an image of said object can be reproduced, comprising:

control means for developing clearing signals occurring at a first rate during a first period of a light capturing cycle, at least one input control signal during a second period of said light capturing cycle, and image read-out signals occurring at a second rate slower than said first rate during a third period of said light capturing cycle;

an image intensifier means responsive to said input control signal and operative to receive input light from the object and to develop a luminous image thereof during a first portion of said second period;

a photo-responsive device having a plurality of contiguous luminous energy sensitive image collecting elements arranged in an orthogonal array of rows and columns of elements, each element of said array being adapted to develop an electrical charge proportional to the intensity of luminous energy focussed thereon, said device being responsive to said clearing signals and operative to shift the electrical charges developed on each element into an adjacent element of an adjacent row to clear each element of electrical charge previously contained therein, said device being additionally responsive to said image read-out signals and operative to shift the electrical charges developed on each element of each row out to adjacent element of an adjacent row, said device including means responsive to said image read-out signals for serially outputting electrical signals proportional to the charge developed on each element of a first particular row of elements, followed by a serial output of electrical signals proportional to the charge developed on each element of an adjacent second particular row of elements, followed by the serial output of electrical signals proportional to the charge developed on each element of each successive adjacent row of elements of said array;

means for communicating luminous energy from said luminous image onto said photo-responsive device during a second portion of said second period;

electronic memory means for receiving and storing the electrical signals output by said photo-responsive device during the input to said photo-responsive device of said image read-out signals; and output means for reading out the electrical signals stored in said memory means to develop an image of said object.

2. A highly controllable video camera as recited in claim 1, and further including mask means for limiting the communication of said luminous energy to a selected area of said photo-responsive device containing particular ones of said image collecting elements.

3. A highly controllable video camera as recited in claim 2, wherein said selected area is comprised of a single row of said image collecting elements, and wherein said photo-responsive device is operative to shift the electrical charges developed on each element of said single row out to adjacent elements of an adjacent row masked by said mask means in response to an image read-out signal.

4. A highly controllable video camera as recited in claim 2, wherein said selected area is comprised of a predetermined number of rows of said image collecting elements, and wherein said photo-responsive device is operative to shift the electrical charges developed on each element of each row of said predetermined number of rows out to adjacent elements of adjacent rows in response to said image read-out signals until the charges developed on each element of a last row within said selected area are shifted out adjacent elements of an adjacent row masked by said mask means.

5. A highly controllable video camera as recited in claim 1, wherein said electronic memory means includes a first group of signal storage sites electronically organized in a first set of orthogonal rows and columns and a second group of signal storage sites electronically organized in a second set of orthogonal rows and columns, wherein each storage site of each row of storage sites of said first group corresponds to a particular element of an odd numbered column of said array of elements, and each storage site of said each row of storage sites of said second group corresponds to a particular element of an even numbered column of said array of elements, and further comprising:

means for communicating the first and each successive alternate signal in the train of electrical signals serially output from said first particular row of elements into a series of corresponding storage sites forming a first column of said first set of storage sites, and for communicating the second and each successive alternate signal in said train of electrical signals serially output from said first particular row of elements into a series of corresponding storage sites forming a first column of said second set of storage sites, and for repeating the communication of signals from each successive row of elements of said array into successive columns of said first and second sets of storage sites; and wherein said output means includes means for successively reading out, in series, the signals stored in each row of said first group of storage sites of said memory means, and for thereafter successively reading out in series the signals stored in each successive row of said second group of storage sites of said memory means to develop a video signal for communication to an interlaced electronic display device, wherein signals read-out from said first group of storage sites form the first field of an interlaced video display and the signals read out from said second group of storage sites form the second field of said interlaced video display such that an image of saaid object may be displayed on the display device.

6. A highly controllable video camera as recited in claim 5 wherein said photo-responsive device includes:
means forming discrete light sensitive elements, and
means for transferring the electrical signals developed by said light sensitive elements one row at a time into an output register, said output register forming said means responsive to said image read-out signals for serially outputting the electrical signals.

7. A highly controllable video camera as recited in claim 1 wherein said photo-responsive device includes:
means forming discrete light sensitive elements, and
means for transferring the electrical signals developed by said light sensitive elements one row at a time into an output register, said output register forming said means responsive to said image read-out signals for serially outputting the electrical signals.

8. A highly controllable video camera as recited in claim 1 wherein said photo-responsive device is a charge-coupled device including means for selectively masking a first selected area of said array of image collecting elements wherein, at any particular time, luminous energy communicated by said communicating means if focussed upon only a second selected area of said array.

9. A highly controllable video camera as recited in claim 1, wherein the electrical signals output from said memory means are input to a digitally responsive device for developing an image of said object.

10. A method for capturing light from an object and converting the same to electronic signals which can be either stored or displayed as an image, comprising the steps of:

developing clearing signals occurring at a first rate within a control means during a first period for communication to a photo-responsive device having a plurality of contiguous luminous energy sensitive image collecting elements arranged in an orthogonal array of rows and columns of elements, each elements of said array ebing adapted to develop an electrical charge proportional to the intensity of luminous energy thereto;

shifting the electrical charge developed on each element into an adjacent element of an adjacent row of elements to clear each element of electrical charge previously contained therein throughout said first period;

developing at least one input control signal within said control means duringa second period for communication to an image intensifier means responsive to said input control signal and operative to receive input light from the object and to develop a luminous image thereof;

exposing said image intensifier to input light from said object and developing said luminous image therefrom during a first portion of said second period in response to said input control signal;

communicating luminous energy from said luminous image to said photo-responsive device during a second portion of said second period;

devleoping image read-out signals occurring at a second rate slower than said first rate within said control means for communication to said photo-responsive device during a third period of said light capturing cycle;

communicating said image read-out signals to said photo-responsive device causing said photo-responsive device to serially output electrical signals proportional to the charge developed on each element of a first particular row of elements, followed by the serial output of electrical signals proportional to the charge developed on each element of each successive adjacent row of elements of said array;

receiving and storing in a memory means the electrical signals serially output by said photo-responsive device during said third period; and reading out the electrical signals stored in said memory means to develop an image of said object.

11. A method for capturing light from an object and converting the same to electronic signals which can be either stored or displayed as an image as recited in claim 10, and further comprising the step of:

masking a first area of said array of image collecting elements from light such that only a second area of said array is exposed to luminous energy.

12. A method for capturing light from an object and converting the same to electronic signals which can be either stored or displayed as an image as recited in claim 11, wherein said second area is comprised of a single row of said elements, and wherein said input control signal and image read-out signals are synchronized so as to create a timed sequence of photographic exposures of said single row, such that after said step of communicating luminous energy to said photo-responsive device, said device shifts the charges developed in said single row of elements to an adjacent row in said first area masked by said mask means, which is immediately followed by the development of a new set of charges in the elements of said single row.

13. A method for capturing light from an object and converting the same to electronic signals which can be either stored or displayed as an image as recited in claim 12, wherein said timed sequence of photographic exposures is additionally synchronized to the motion of said object.

14. A method for capturing light from an object and converting the same to electronic signals which can be either stored or displayed as an image as recited in claim 12, wherein said timed sequence of photographic exposures is a random linear sequence.

15. A method for capturing light from an object and converting the same to electronic signals which can be either stored or displayed as an image as recited in claim 12, wherein said timed sequence of photographic exposure is a logrithmic sequence.

16. A method for capturing light from an object and converting the same to electronic signals which can be either stored or displayed as an image as recited in claim 11, wherein said second area is comprised of a predetermined number of rows of said elements, and wherein after each input control signal causes said image intensifier means to communicate luminous energy to said photo-responsive device, said imaged read-out signals cause the charges developed in the elements of said second area to be shifted into said first area, from which said charges are ultimately serially output, following the shift a new set of charges is developed in the elements of said second area in response to a subsequent input control signal.

17. A method for capturing light from an object and converting the same to electronic signals which can be either stored or displayed as an image as recited in claim 10, wherein said first and second portions of said second period are repeated a predetermined number of times before said third period is commenced.

18. A method for capturing light from an object and converting the same to electronic signals which can be either stored or displayed as an image as recited in claim 10 wherein said step of receiving and storing includes the steps of: and (a) communicating the first and each successive alternate signal in a train of electrical signals serially output from said first particular row of elements to said memory means having a first group of signal storage sites electronically organized in a first set of orthogonal rows and columns and a second group of signal storage sites electronically organized in a second set of orthogonal rows and columns, wherein each storage sites of each row of storage sites of said first group corresponds to a particular element of an odd numbered column of said array of elements, and each storage site of each row of storage sites of said second group corresponds to a particular element of an even numbered column of said array of elements;

(b) storing said first and each successive alternate signal in a series of corresponding storage sites forming a first column of said first storage sites;

(c) communicating the second and each successive alternate signal in said train of electrical signals serially output from said first particular row of elements to said memory means;

(d) storing said second and each successive alternate signal into a series of corresponding storage sites forming a first column of said second set of storage sites;

(e) repeatedly communicating and storing signals from each successive row of elements into successive columns of said first and second sets of storage.

19. A method for capturing light from an object and converting the same to an electronic signal which can be either stored or displayed as an image as recited in claim 18, wherein said step of reading out the electronical signals stored in said memory means includes the steps of:

successively reading out, in series, the signals stored in each row of said first group of storage sites of said memory device, and thereafter successively reading out, in series, the signals stored in each successive row of said second group of storage sites of said memory device, and communicating the signals, as readout, of said memory device to an interlaced electronic display device, wherein signals readout from said first group of storage sites form the first field of an interlaced video display and the signals readout from said second group of storage sites form a second field of said interlaced video display such that an image of said object may be displayed on the display device.

20. A method for capturing light from an object and converting the same to an electronic signal which can be either stored or displayed as an image as recited in claim 19, wherein said step of exposing a photo-responsive device to light further comprises the step of:

masking a first area of said array of image collecting elements from light, whereby a second area of said array includes the remainder of said elements exposed to light.

21. A method for capturing light from an object and converting the same to an electronic signal which can be either stored or displayed as an image as recited in claim 20, wherein said second area is comprised of a single row of said elements, and wherein said input control signal and image read-out signals are synchronized so as to create a timed sequence of photographic exposures of said single row, such that after said step of communicating luminous energy to said photo-responsive device, said device shifts the charges developed on said single row of elements to an adjacent row in said first area masked by said mask means, which is immediately followed by the development of a new set of charges in the elements of said single row.

22. A method for capturing light from an object and converting the same to an electronic signal which can be either stored or displayed as an image as recited in claim 20, wherein said second area is comprised of a predetermined number of rows of said elements, and wherein after each input control signal causes said image intensifier means to communicate luminous energy to said photo-responsive device, said image read-out signals cause the charges developed in the elements of said second area to be shifted into said first area, from which said charges are ultimately serially output, following the shift a new set of charges is developed in the elements of said second area in response to a subsequent input control signal.

23. A highly controllable video camera for capturing light from an object and developing a corresponding video signal, comprising:

a photo-responsive device having a plurality of contiguous light sensitive image collecting elements arranged in an orthogonal array of rows and columns of elements, each said element being adapted to develop an electrical charge proportional to the intensity of light focussed thereon, said device including means for serially outputting electrical signals proportional to the charge developed by each element in a first particular row of elements, followed by the serial output of electrical signals proportional to the charge developed by each element of an adjacent second particular row of elements, followed by the serial output of electrical signals proportional to the charge developed by each element of each successive adjacent row of elements of said array;

optical means for selectively communicating light from an object onto said photo-responsive device;

electronic memory means having a first group of signal storage sites electronically organized in a first set of orthogonal rows and columns and a second group of signal storage sites electronically organized in a second set of orthogonal rows and columns, wherein each storage site of each said row of storage sites of said first group corresponds to a particular element of an off numbered column of said array of elements, and each storage site of each said row of storage sites of said second group corresponds to a particular element of an even numbered column of said array of elements;

means for communicating the first and each successive alternate signal in the train of electrical signals serially output from said first particular row of elements into a series of corresponding storage sites forming a first column of said first set of storage sites, and for communicating the second and each successive alternate signal in said train of electrical signals serially output from said first particular row of elements into a series of corresponding storage sites forming a first column of said second set of storage sites, and for repeating the communication of signals from each successive row of elements of said array into successive columns of said first and second sets of storage sites; and means for successively reading out, in series, the signals stored in each row of said first group of storage sites of said memory means, and for thereafter successively reading out in series the signals stored in each successive row of said second group of storage sites of said memory means to develop a video signal for communication to an interlaced electronic display device, wherein signals readout from said first group of storage sites form the first field of an interlaced video display and the signals readout from said second group of storage sites form the second field of said interlaced video display such that an image of said object may be displayed on the display device.

24. A highly controllable video camera as recited in claim 23, wherein said photo-responsive device is a charge-coupled-device having means for selectively masking a first area of said array of image collecting elements wherein, at any particular time, light communicated by said optical means is focussed upon a second area of said array.

25. A highly controllable video camera as recited in claim 23, wherein said optical means includes an electronic image intensifier means operative to receive input light from said object and develop a luminous image thereof.

26. A highly controllable video camera as recited in claim 25, wherein said optical means further includes a focussing means for communicating said luminous image as luminous energy onto said array.

27. A method for capturing light from an object in a high speed video camera and developing a video signal therefrom comprising the steps of:

(a) selectively communicating light from an object onto a photo-responsive device;

(b) collecting light communicated from said object with a plurality of contiguous light sensitive image collecting elements arranged in an orthogonal array of rows and columns of elements, each element of said array being adapted to develop an electrical charge proportional to the intensity of light collected thereby;

(c) serially outputting electrical signals proportional to the charge developed by each element in a first particular row of elements, followed by serially outputting electrically signals proportional to the charge developed by each element of an adjacent second particular row of elements, followed by serially outputting electrical signals proportional to the charge developed by each element of each successive adjacent row of elements of said array;

(d) communicating the first and each successive alternate signal in a first train of electrical signals serially output from said first particular row of elements to a memory device having a first group of signal storage sites electronically organized in a first set of orthogonal rows and columns and a second group of signal storage sites electronically organized in a second set of orthogonal rows and columns, wherein each storage site of each row of storage sites of said first group corresponds to a particular element of an odd numbered column of said array of elements, and each storage site of each row of storage sites of said second group corresponds to a particular element of an even numbered column of said array of elements;

(e) storing said first and each successive alternate signal in a series of corresponding storage sites forming a first column of said first set of storage sites;

(f) communicating the second and each successive alternate signal in said first train of electrical signals serially output from said first particular row of elements to said memory device;

(g) storing said second and each successive alternate signal into a series of corresponding storage sites forming a first column of said second set of storage sites;

(h) repeatedly communicating and storing the first and each successive alternate signal of a second train of electrical signals serially output from a second and each successive adjacent row of elements of said array into a series of corresponding storage sites forming a second column and successive adjacent columns of said first set of storage sites;

(i) repeatedly communicating and storing the second and each successive alternate signal of said second train of said electrical signals serially output from said second train of said electrical signals serially output from said second and each said successive adjacent row of elements of said array into a series of corresponding storage sites forming a second column and successive adjacent columns of said second set of storage sites;

successively reading out, in series, the signals stored in each row of said first group of storage sites of said memory device, and thereafter successively reading out, in series, the signals stored in each row of said second group of storage sites of said memory device; and communicating the signals, as readout, of said memory device to an interlaced electronic display device, wherein signals readout from said first group of storage sites form the first field of an interlaced video display and the signals readout from said second group of storage sites form a second field of said interlaced video display such that an image of said object may be displayed on the display device.

28. A method for capturing light from an object as recited in claim 26, wherein said step of selectively communicating light further comprises the step of:

(1) masking a first area of said array of image collecting elements, wherein at any particular time, light communicated from said object is only collected by a second area of said array.

29. A method for capturing light from an object as recited in claim 27, wherein said step of selectively communicating light further comprises the steps of:

(1) collecting light input from said object with an image intensifier device during a first period; and (2) communicating said light to said photo-responsive device during a second period of time.

30. A highly controllable video camera for capturing light from a rapidly occurring random event and developing corresponding electrical signals from which an image of said event can be reproduced, comprising:

control means for developing clearing signals occurring at a first rate during a first period prior to said event, an input control signal during a second period at the start of said event, and image read-out signals occurring at a second rate slower than said first rate during a third period at the end of event;

means for detecting the commencement and cessation of said event and developing event commencement and event cessation signals for communication to said control means, said event commencement signal being communicated to said control means at the start of said event causing said control means to develop said input control signal, said event cessation signal being communicated to said control means at the end of said event causing said control means to develop said image read-out signals;

a photo-responsive device having a plurality of contiguous light sensitive image collecting elements arranged in an orthogonal array of rows and columns of elements, each element of said array being adapted to develop an electrical charge proportional to the intensity of light focussed thereon, said device being responsive to said clearing signals and operative to shift the electrical charges developed on each element into an adjacent element of an adjacent row to clear each element of electrical charge previously contained therein, said device being additionally responsive to said image read-out signals and operative to shift the electrical charges developed on each element of each row out to adjacent elements of an adjacent row, said device including means responsive to said image read-out signals for serially outputting electrical signals proportional to the charge developed on each element of a first particular row of elements, followed by a serial output of electrical signals proportional to the charge developed on each element of an adjacent second particular row of elements, followed by the serial output of electrical signals proportional to the charge developed on each element of each successive adjacent row of elements of said array;

means for selectively communicating the light from said event onto said photo-responsive device;

electronic memory means for receiving and storing the electrical signals output by said photo-responsive device during the input to said photo responsive device of said image read-out signals; and output means for reading out the electrical signals stored in said memory means to develop said image of said event.

31. A highly controllable video camera for capturing light from a rapidly occurring random event and developing corresponding electrical signals from which an image of said event can be reproduced as recited in claim 30, wherein said detector means is a light sensitive device.

32. A highly controllable video camera for capturing light from a rapidly occurring random event and developing corresponding, electrical signals from which an image of said event can be reproduced as recited in claim 30, wherein said detector means is a switching device.

* * * * *